United States Patent
Voth et al.

(10) Patent No.: US 9,211,671 B2
(45) Date of Patent: Dec. 15, 2015

(54) APPARATUS FOR RESHAPING PLASTIC PREFORMS, HAVING A HEATING DEVICE

(75) Inventors: Klaus Voth, Obertraubling (DE); Frank Winzinger, Regensburg (DE); Konrad Senn, Regensburg (DE)

(73) Assignee: Krones AG, Neutraubling (DE)

( * ) Notice: Subject to any disclaimer, the term of this patent is extended or adjusted under 35 U.S.C. 154(b) by 547 days.

(21) Appl. No.: 13/262,630

(22) PCT Filed: Mar. 10, 2010

(86) PCT No.: PCT/EP2010/053023
§ 371 (c)(1),
(2), (4) Date: Dec. 16, 2011

(87) PCT Pub. No.: WO2010/112307
PCT Pub. Date: Oct. 7, 2010

(65) Prior Publication Data
US 2012/0091636 A1    Apr. 19, 2012

(51) Int. Cl.
*B29C 49/64*      (2006.01)
*B29C 49/42*      (2006.01)
*B29C 33/26*      (2006.01)
(Continued)

(52) U.S. Cl.
CPC ............ *B29C 49/64* (2013.01); *B29C 49/4205* (2013.01); *B29C 33/26* (2013.01); *B29C 49/06* (2013.01); *B29C 49/12* (2013.01); *B29C 49/36* (2013.01); *B29C 49/6436* (2013.01); *B29C 49/6445* (2013.01); *B29C 49/78* (2013.01); *B29C 2035/0855* (2013.01); *B29C 2049/129* (2013.01); *B29C 2049/1257* (2013.01); *B29C 2049/1295* (2013.01); *B29C 2049/4231* (2013.01); *B29C 2049/4697* (2013.01); *B29C 2049/4892* (2013.01); *B29C 2791/001* (2013.01); *B29K 2067/00* (2013.01)

(58) Field of Classification Search
CPC ................................ B29C 49/64; B29C 49/78
See application file for complete search history.

(56) References Cited

U.S. PATENT DOCUMENTS 5,468,443 A * 11/1995 Takada et al. ................. 264/537
7,399,435 B2 * 7/2008 Dunzinger et al. .......... 264/40.1
(Continued)

FOREIGN PATENT DOCUMENTS

CN      1039211 A      1/1990
DE      694 02 543 T2      12/1997
(Continued)

OTHER PUBLICATIONS

International Search Report dated Jun. 23, 2010, issued in counterpart International Application No. PCT/EP2010/053023.
(Continued)

*Primary Examiner* — Monica Huson
(74) *Attorney, Agent, or Firm* — Novak Druce Connolly Bove + Quigg LLP

(57) ABSTRACT

An apparatus for reshaping plastic preforms into plastic containers includes a plurality of blow-molding stations that each have at least one receptacle space, within which the plastic preforms can be expanded into the plastic containers. The apparatus also includes a conveying device that conveys the containers along at least one specified travel path, wherein the apparatus has a plurality of heating devices that are arranged along the travel path of each container, upstream of the blow-molding stations, wherein at least one heating device is allocated to at least one blow-molding station.

22 Claims, 6 Drawing Sheets

(51) Int. Cl.
*B29C 49/06* (2006.01)
*B29C 49/12* (2006.01)
*B29C 49/36* (2006.01)
*B29C 49/78* (2006.01)
*B29C 35/08* (2006.01)
*B29C 49/46* (2006.01)
*B29C 49/48* (2006.01)
*B29K 67/00* (2006.01)

(56) References Cited

U.S. PATENT DOCUMENTS

2003/0001311 A1 1/2003 Collette et al.
2010/0052224 A1 3/2010 Humele et al.

FOREIGN PATENT DOCUMENTS

EP 0 566 995 A1 10/1993
FR 2 704 845 A1 11/1994
WO 2007/131701 A2 11/2007

OTHER PUBLICATIONS

German Search Report dated Oct. 5, 2010, issued in counterpart German Application No. 10 2009 015 519.8.
German Search Report dated Jun. 2, 2015, issued in European Application No. 10 708 760.3.
International Search Reported dated Nov. 15, 2011, issued in corresponding International Application No. PCT/EP2010/05302.
Chinese Office Action dated Sep. 16, 2013, issued in corresponding Chinese Application No. 201080015615.1.
Chinese Office Action dated Apr. 10, 2014, issued in corresponding Chinese Application No. 201080015615.1.

* cited by examiner

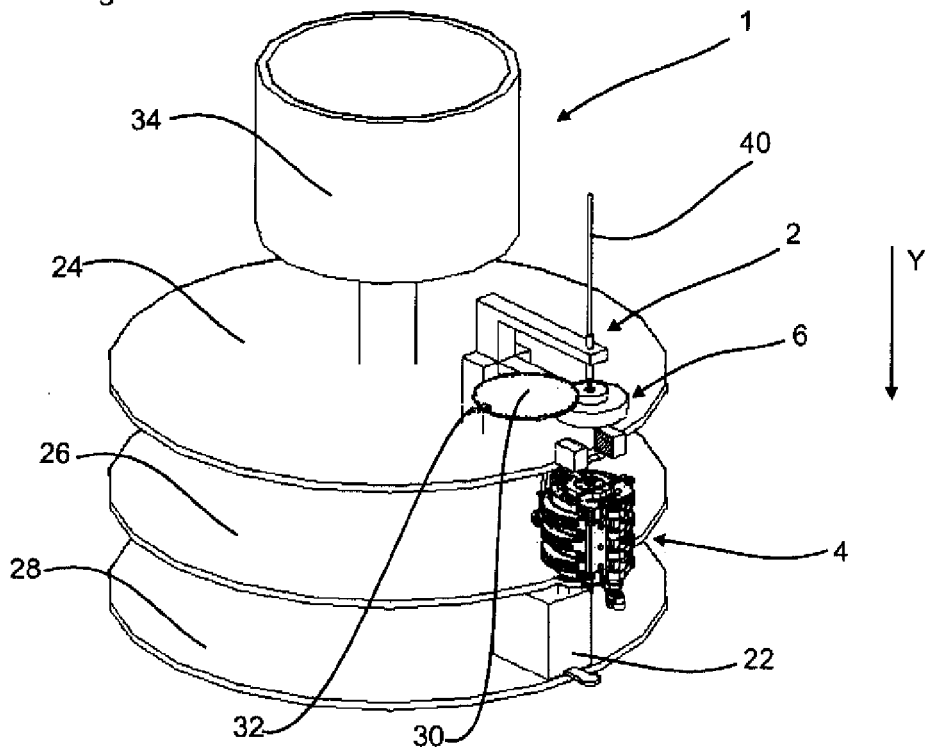

APPARATUS FOR RESHAPING PLASTIC PREFORMS, HAVING A HEATING DEVICE

CROSS-REFERENCE TO RELATED APPLICATIONS

This application is filed under 35 U.S.C. 371 as a U.S. national phase application of PCT/EP2010/053023, having an international filing date of 10 Mar. 2010, which claims the benefit of German Patent Application No. 10 2009 015 519.8, having a filing date of 2 Apr. 2009, both of which are hereby incorporated by reference.

TECHNICAL FIELD

The present invention relates to an apparatus for reshaping plastic preforms into plastic containers.

BACKGROUND

Such apparatus has long been known from the prior art. Plastic preforms, made for example from PET, are reshaped in such apparatus by means of the application of pressure. In this connection a plurality of blow moulding stations are usually disposed on a carrier wheel and each of these blow moulding stations has a blow mould for expanding the plastic preforms.

It is usually necessary for such plastic containers to be heated further before the actual expansion operation. In this case it is usual for a furnace through which the individual plastic preforms pass to be disposed upstream of the actual forming stations, for example blow moulding stations. This means that a certain quantity of plastic preforms are heated during transport and then the heated preforms are distributed to the individual blow moulding stations.

An apparatus for producing elements at fixed work stations is known from DE 694 02 543 T2. For this purpose a continuous and regularly moving conveyor is provided which carries a plurality of element carriers. Means are provided for unloading the elements from each feeding device to the element carriers and independent means are provided for control of each of these means.

The object of the present invention is to provide a reshaping apparatus, which is in particular stationary, which makes possible a defined heating operation for the particular plastic containers.

SUMMARY

An apparatus according to the invention for reshaping plastic preforms into plastic containers has a plurality of blow moulding stations which each have at least one receiving chamber within which the plastic preforms can be expanded to plastic containers. A transport system is also provided which transports the containers along at least one predetermined transport path. According to the invention the device has a plurality of heating devices which are disposed along the transport path of each container upstream of the blow moulding stations, wherein at least one heating device is associated with at least one blow moulding station.

Whereas in the prior art, as mentioned above, first of all the preforms pass through a heating station and are then fed to the blow moulding stations, according to the invention it is proposed to provide a certain co-ordination between the heating devices and the blow moulding stations. In this case it is possible for precisely one blow moulding station to be associated with precisely one heating device, but it would also be possible for several blow moulding stations to be associated with one heating device or for several heating devices to be associated with one blow moulding station. In particular, therefore, a preform which has been heated in a specific heating device is also reshaped by a specific blow moulding station or by a blow moulding station of a specific group of blow moulding stations. This association of the blow moulding stations with the heating devices also makes it possible to treat different preforms individually. Furthermore in this way it can be ensured that a container is expanded very shortly before the heating operation.

The transport device in particular transports the preforms from the heating device to the blow moulding station. In addition, however, further components of the transport device can transport the preforms to the heating device or also can transport the finished containers away again from the blow moulding station.

The paths on which the preforms are transported through the apparatus and in particular the paths on which the preforms are transported through the heating devices are advantageously different.

In a further preferred embodiment the blow moulding stations are disposed so as to be stationary. This stationary arrangement of the blow moulding stations produces simplifications in the overall design of the apparatus according to the invention.

Advantageously the heating devices are also disposed so as to be stationary. In this case it is possible for the heating devices to be controllable independently of one another. It is also possible for the heating devices to be constructed in such a way that specific regions of a preform in the peripheral direction thereof are heated more and others are heated less. In this way so-called "preferential heating" can be implemented, which is advantageous in particular for producing containers having a cross-section which deviates from a circular cross-section.

Advantageously the heating devices and the blow moulding stations are also disposed stationary with respect to one another or also of modular construction. In this way it would be possible for example that with the aid of a feeding device first of all preforms can be distributed to a plurality of heating devices, and then each of these preforms is transferred with the aid of a transport system from the heating device to the respective blow moulding station associated with this heating device and the finished containers are transported away again.

In a further advantageous embodiment the blow moulding stations are disposed along a circular path. Particularly advantageously the individual blow moulding stations are disposed on a circular carrier. The individual heating devices are also advantageously provided on this carrier.

However, it would also be possible for the individual blow moulding stations, preferably together with their associated heating devices, to be disposed along a linear path.

In this case, in particular, if the blow moulding stations and the heating devices respectively are constructed together as modular units this offers the advantage that more or fewer of these blow moulding stations or heating devices can be provided individually according to the customer's requirements. The apparatus advantageously has the same number of blow moulding stations and heating devices.

In a further advantageous embodiment at least one heating device is a microwave heating device, i.e. this heating device uses microwaves for heating the containers. Advantageously all of the said heating devices are microwave heating devices. In addition, however, the apparatus may also have infrared heating devices.

In a further advantageous embodiment the heating devices are disposed radially within the blow moulding stations. Thus it is possible for example for a transport device to transport the containers first of all into the heating devices and then into the individual blow moulding stations.

In addition it is advantageously possible for the heating devices to be disposed above or below the blow moulding stations. Microwave heating devices are also suitable for this embodiment in a special way, since it is possible here to transport the containers along their longitudinal direction through the said microwave heating devices.

In a further advantageous embodiment a distributor is provided radially within the blow moulding stations to distribute the preforms to the heating devices. This means that incoming preforms can for example be ordered in a row and then distributed to the individual heating devices.

In a further advantageous embodiment a respective heating device with a respective blow moulding station forms a modular unit. In this case precisely one blow moulding station is associated with each heating device.

However, if the heating device with a respective blow moulding station is constructed as a modular unit this offers the advantage that, as mentioned above, at the customer's request modules can be added to existing systems or a system can be built individually with basically any numbers of heating and blow moulding stations.

This modular unit also has a transport device to convey the preforms from the heating device to the blow moulding station. In this embodiment this transport device is also a component of the respective module. In addition each of these modules can also have a control device which controls the interaction of the heating device and the blow moulding station. Thus this module can for example be connected to a central machine control, but in particular it forms a technical unit which is independent per se. In this embodiment such a device preferably has a plurality of transport devices which can be controlled independently of one another and which convey the containers in each case from the heating device in the blow moulding station.

In a further advantageous embodiment the apparatus has a preheating unit for heating the preforms and this preheating unit is preferably disposed upstream relative to the heating device in the transport direction of the preforms. Experiments conducted by the applicant have shown that heating in particular of PET preforms for a stretch blow moulding process by means of a microwave heating device is more favourable from the energy point of view than the infrared technology usually used. From the point of view of process engineering the modular units mentioned above result in each preform being heated individually. However, this results in substantial outlay on controls, but on the other hand new or also long outdated machine designs can be used.

It has also been shown that preheating of the preforms before the actual heating by microwaves can be favourable, since with regard to its efficiency the heating of a PET preform by means of microwaves is also substantially dependent upon the already prevailing temperature of the preform. Therefore by preheating the preform it is possible to configure subsequent heating by the microwave heating device more efficiently.

In this case it would be possible for a preheating device to be associated with each modular unit consisting of a heating device and a blow moulding station. However, it would also be possible to provide a central preheating unit through which all the PET preforms pass and then the preforms preheated in this way are fed to the respective modules consisting of a heating device and a blow moulding station. In the latter variant the respective heating and blow moulding modules are provided with already preheated preforms.

As mentioned, the heating device and the blow moulding station are advantageously constructed as a modular unit. In this case the preform is transported between these two components of the modular unit. This transport device advantageously transports the preforms between the heating station and the blow moulding station at least at times in their longitudinal direction. It would also be possible for a predetermined number of heating units to be combined with the same number of blow moulding stations into a module, so that a corresponding modular unit is formed for example from N blow moulding stations and N heating devices. Also these modules could be combined in such a way that customers can be offered a machine with the required number of blow moulds.

In a further advantageous embodiment the apparatus has a further transport device which removes the blow moulded containers from the blow moulding stations. This further transport device can preferably convey the individual containers separately.

Advantageously at least one transport device transports the containers cyclically, i.e. transport is not carried out continuously but with moving and resting phases.

In a further advantageous embodiment the heating devices are disposed in a peripheral direction at least in sections between the blow moulding stations. A saving of space can be achieved in this way.

In a further advantageous embodiment the heating devices are disposed in a peripheral direction at least in sections between the blow moulding stations and radially within the blow moulding stations. A saving of space can be achieved in this way.

In a further advantageous embodiment a further heating device is associated with each blow moulding station. This further heating device may in particular be an infrared heating device. These individual further heating devices are preferably also controllable independently of one another.

In a further advantageous embodiment sterilising devices are provided which sterilise the preform on a part-zone of the transport path. Likewise devices for maintaining a degree of sterilisation can be provided.

In a further advantageous embodiment labelling devices are provided which label the preform on a part-zone of the transport path. Likewise devices for filling the containers can be provided on this transport path.

The present invention is also directed to a method of reshaping plastic preforms into plastic containers, wherein the plastic preforms are transported by a transport device along at least one transport path and are heated by means of a heating device and after the heating operation are reshaped into plastic containers by means of blow moulding stations.

According to the invention plastic containers which are heated by a specific heating device are expanded to plastic containers by a predetermined blow moulding station or by a blow moulding station which is selected from a predetermined group of blow moulding stations. This means that in terms of the method it is also proposed to create an association between the heating devices and the blow moulding stations.

At least two plastic preforms or containers are preferably transported on different paths. Since as mentioned the blow moulding stations are advantageously disposed so as to be stationary, different preforms which reach different blow moulding stations take different transport paths. The transport of the containers preferably takes place cyclically. In a further advantageous embodiment at least the blow moulding stations or the heating units and preferably both the blow moulding stations and the heating units are disposed stationary.

After production, the containers are preferably labelled by a stationary labelling assembly and during labelling the containers are particularly preferably set only in rotary motion. A translational movement of the bottles is not required for the labelling time period. A corresponding labelling device could be disposed for example above or below the heating device.

BRIEF DESCRIPTION OF THE DRAWINGS

Further advantages and embodiments are apparent from the appended drawings, in which:

FIG. 1 shows a schematic representation of an apparatus according to the invention;

FIG. 2 shows a detail of the apparatus shown in FIG. 1;

DESCRIPTION

Figure 3:
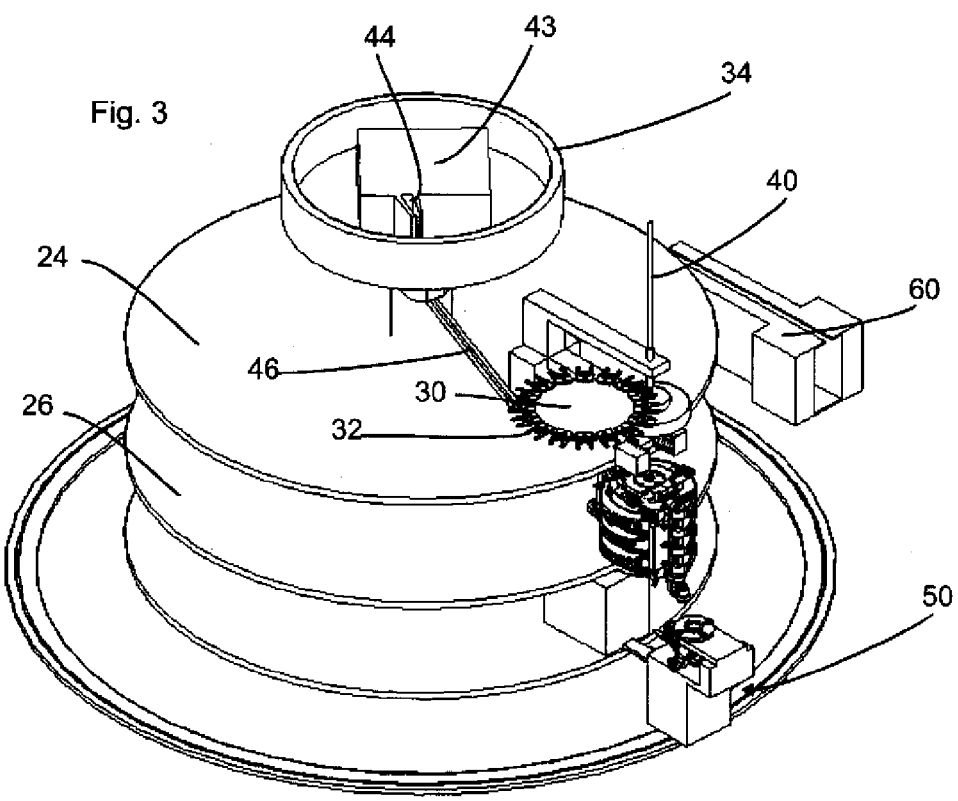
FIG. 3 shows a further overall representation of the apparatus shown in FIG. 1.

FIG. 1 shows a schematic view of an apparatus 1 according to the invention for forming plastic containers. A transport device is provided which is denoted as a whole by 2 and transports containers 10. This apparatus 2 has a first transport unit 30 which is constructed here as a rotatable disc 30 or a rotatable star with a plurality of gripper elements 32. Furthermore the apparatus has a plurality of heating devices which serve for heating the plastic preforms, although only one heating device 6 is shown. A blow moulding station 4 which serves for expanding the preforms is provided below the heating device 6. The preforms are lowered here in the direction Y into the blow moulding station 4 after they have been heated in the heating device 6. For this purpose the apparatus has a second transport device 40 which is movable in the direction Y.

Below the blow moulding station 4 is provided a labelling device 22 which provides the containers thus produced with labels. The reference numerals 24, 26 and 28 refer to three carriers, wherein the transport device 2 is disposed on the uppermost carrier 24, the blow moulding station 4 on the central carrier 26 and the labelling device 22 on the lower carrier 28. The reference numeral 34 relates to a housing to receive preforms. A plurality of blow moulding stations 4 are disposed on the individual carriers—advantageously uniformly distributed in the peripheral direction. Several labelling devices 22 can also be provided. In another embodiment there may also be one or more labelling devices 22 which are associated with several blow moulding stations. In this case an additional distributor (not shown) for the labels would be conceivable.

In an advantageous embodiment a filling device (not shown) is disposed in the region of the transport path oriented in the Y direction. In the filling device the containers are filled or filled and closed before or after labelling.

FIG. 2 shows a detail of the apparatus shown in FIG. 1. A carrier 18 is also shown on which the transport unit 40 is disposed. The containers (not shown here) or preforms are gripped by the gripper devices 32 and are transported along a circular path to above the region of the heating device 6. In this region they are picked up by a further retaining element, for example a mandrel which engages in the mouth of the container. In a further step the containers are lowered in the direction Y and are conveyed through the heating device 6. A further heating device 42 can be disposed below the heating device 6, and in this case is an infrared heating device. After the containers have been heated in this way they are introduced into the blow moulding station 4, wherein this blow moulding station 4 has two blow mould halves 16a, 16b which can be hinged apart. In addition to hinging up or pivoting up the blow moulding stations about an axis, it is also conceivable to provide for a linear delivery movement of at least one blow mould half 16a. The movement of the blow mould halves 16a, 16b could be effected by an electric drive, preferably via a servomotor. In another embodiment toggle levers are preferably used for closing the blow mould halves. In an advantageous embodiment the further heating device 42 may also be radiation devices which emit light in the near infrared range or preferably between 1700 nm and 2100 nm. In addition to the heating device 6 and 42 a second further heating device (not shown) may also be disposed in the region upstream of the heating device 6. The preforms are preheated to a predetermined temperature in the second further heating device. The preforms are preferably preheated to a temperature in the range from 35° C. to 80° C. in the second further heating device. Thus a microwave heating device could operate more efficiently. Only after the preheating is a temperature profile produced in the longitudinal axis on the preform 10 in the heating device 6.

FIG. 3 shows a further detailed view of an apparatus according to the invention. It will be seen that a plurality of gripper devices is disposed on the transport wheel 30. It will also be seen that within the housing 34 to receive the preforms a further collecting container 43 for preforms is disposed which has an outlet opening 44 or an outlet slot through which the preforms are guided onto a transport track 46 which is also a component of the transport device denoted overall by 2. The transport track 46 conveys the preforms actively by means of blowers (not shown) or the preforms 10 slide down under their own weight on the transport track 46. For this purpose they are held below their support ring. It will also be seen that the preforms are guided on the carrier wheel 30 along a transport path in the shape of a circular segment and in addition they are also guided in a plane which is parallel to the plane of the individual carriers 24, 26 and 28. By contrast the transport unit 40 conveys the preforms in a direction which is perpendicular thereto. Therefore in terms of the method a transport direction of the preforms is altered by an angle of 90° in this case. A stretching rod for expanding the plastic preforms during the expansion operation is preferably provided within the transport unit 40. Pressure can additionally be applied to the preform inside the blow moulding station 4 by the stretching rod.

The reference numeral 60 relates to a further apparatus for removal of the preforms which are explained in greater detail below. The reference numeral 50 also denotes a transport device which transports the ready-blown containers, wherein the containers are again transported in a plane which is parallel to the individual carriers 24, 26.

Figure 4:
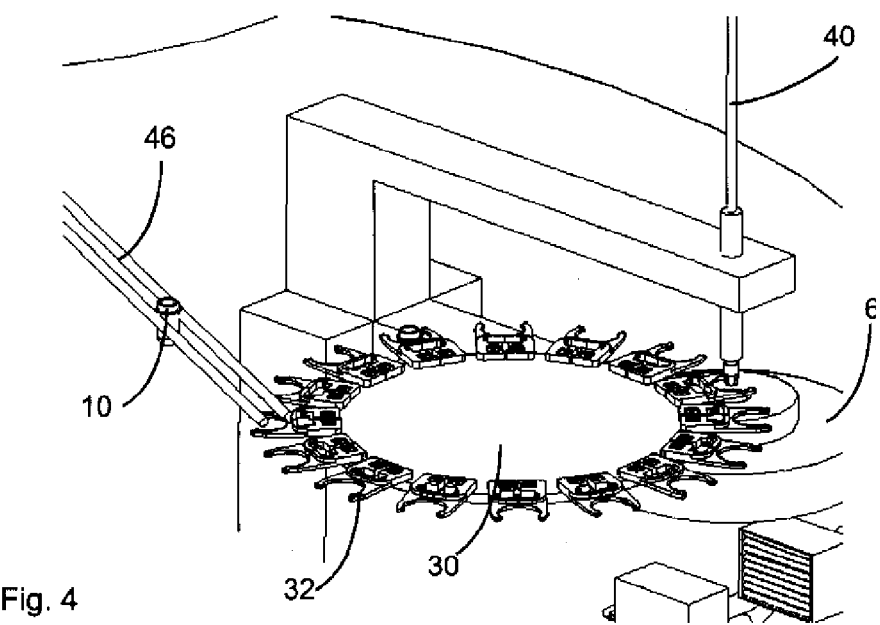
FIG. 4 shows a detail of a transport device for the apparatus according to the invention.

FIG. 4 shows a view of a further detail. This again shows the transport track 46 by means of which preforms 10 are conveyed. At the lower end of the transport track the preforms are taken into the individual gripper devices 32 where they are conveyed clockwise with the carrier wheel 30 until they lie below the transport unit 40. In this region the gripper device holding the preform 10 can for example open and in this way can release the preform 10, so that the preform can now be transported downwards through the heating device 6 in the direction Y.

Also in the view in FIG. 3 only one blow moulding station as well as one heating device are shown. In addition to the transport track shown here a roller system could also be provided which carries out pre-sorting of the preforms. Furthermore it would be possible to use a disc sorter (not shown) which has a plurality of drops for discharge of the preforms onto different carrier wheels 30 or tracks 46. A further star wheel with a plurality of gripper devices could also be connected to the blow moulding station 4, and this star wheel transfers the finished containers, which if appropriate are already labelled, to a filling station. In addition belt transport would also be conceivable. It would also be possible to use a sawtooth star wheel for transporting the preforms 10 to the transport unit 40.

In a further embodiment the carrier wheel could be omitted and the track 46 or several tracks 46 which are distributed in the circumferential direction, optionally via diverters, are guided directly in the region below the transport unit 40. Thus it would be possible for example for an end piece of such a transport track to have a track element which is movable perpendicular to the direction of movement of the preforms so that the individual preforms can be released in this way. In this way the transport unit 40 could take up the respective preform disposed at the end of such a track and so synchronisation would also be possible—but only by the transport unit 40. It would be possible for drives, such as for example servomotors, magnetic or pneumatic drives, to be used for driving the transport unit 40 in the Y direction, but also for rotary driving.

Figure 5:
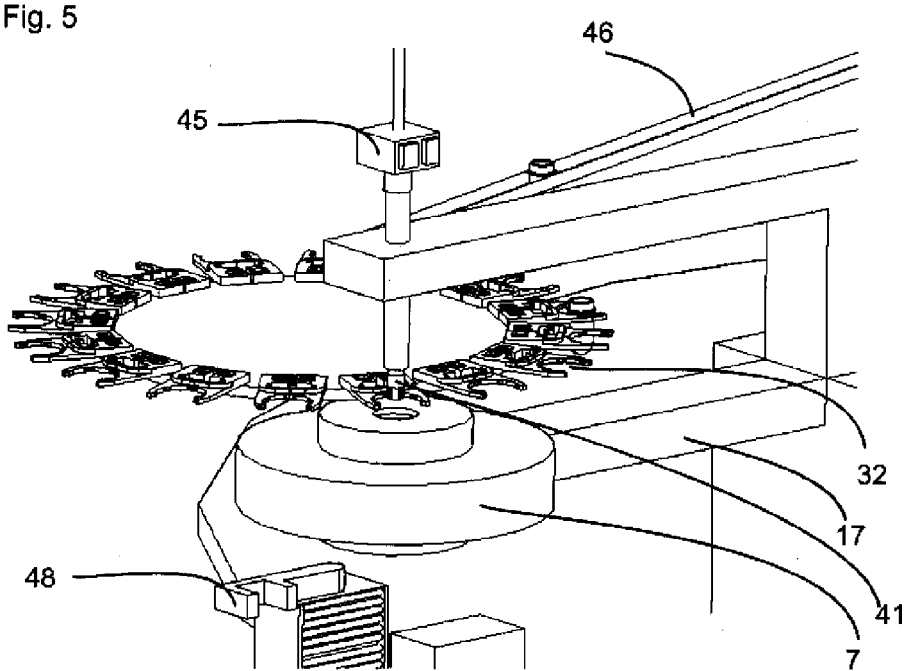
FIG. 5 shows a detail of the transport device shown in FIG. 4.

FIG. 5 shows a further view of the apparatus according to the invention. In this view a mandrel 41 is discernible which engages in a mouth of the preform. At the same time this mandrel is configured here as a blowing nozzle in order to apply compressed air to the preform in order to expand it. Furthermore for this purpose a valve block 45 with a plurality of valves (not shown in detail) is provided in order to control the delivery of air into the preform. However, it would also be conceivable in addition to provide a blowing nozzle which for example pivots laterally inwards in order to apply compressed air to the preform.

After the mandrel 41 has entered the mouth of the preforms the containers can be transported in the direction Y through the heating device 6. The reference numeral 17 relates to a hollow waveguide which conveys the microwaves emanating from a magnetron (not shown) into the resonator 7 of the heating device 6.

In a further advantageous embodiment it would also be possible for the transport unit 40 to be rotatable about its own axis, so that the preform 10 can be transported with a specific rotated position about its own axis through the heating device 6. It would also be possible in this way to heat individual regions of the preform differently from other regions in order in this way to achieve the preferential heating of the preform already described above.

In a further embodiment a control means and preferably a regulating means can be provided which effect a thermal profiling of the preform 10 in its longitudinal axis. In the resonator a sensor device (not shown) measures the temperatures of different regions of the preform 10 and compares the measured values with predetermined desired values. If a desired value is reached a signal is transmitted to a control device 2 (not shown) so that advance of the transport unit in the Y direction should be initiated.

It would be possible for an inspection device to be disposed in the region of the transport path downstream of the blow moulding station 4. The inspection device inspects the container with regard to predetermined geometric, thermal or chemical values, such as for example sterility, wall thicknesses or temperatures and compares these with predetermined desired values and passes the results to a control circuit. Thus by the association of individual blow moulding stations 4 with individual heating devices 6 an individual regulation of the individual heating devices for individual profiling, but also of such parameters as stretching rate of the stretching rod, initial blowing pressure, final blowing pressure and the time allocated to the preform of individual stations.

It would be conceivable for the stretching rod to be driven by its own drive means separately from the drive means of the transport device 2, 40. In addition it would be possible for drives, such as for example servomotors, magnetic or pneumatic drives, to be disposed for driving on the stretching rod on the transport device 2, 40. Since in the case of stationary blow moulding stations the stretching rate can be controlled separately, and not by means of cam tracks which are difficult to replace as in the prior art, use of a regulating means for the stretching rate is particularly recommended.

In another embodiment ejector devices are disposed in the region of the transport path (not shown) and serve to separate out defective or incorrectly position preforms or containers 10 on the basis of signals from different control circuits or inspectors.

Figure 6:
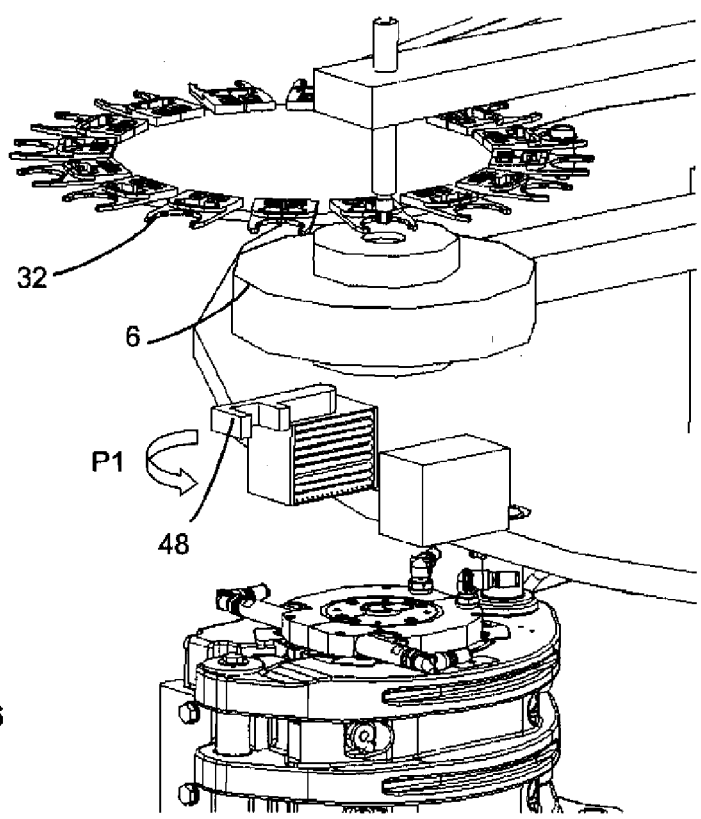
FIG. 6 shows a further detail of the apparatus according to the invention.

FIG. 6 shows a further view of the apparatus according to the invention. This also shows in particular the further heating device 42 which additionally heats the preforms. As mentioned above, this is an infrared heating device. The reference numeral 48 denotes a shielding element which grips the preform and also serves to partially shield the preform. Thus for example the mouth region of the preform can be protected against heating, since in particular the thread on the preforms should not be heated. It would also be possible to shield individual regions of the preform in the circumferential direction by the shielding device 48 in order in this way to achieve heating of only portions of the preform. In this case the shielding element is pivotable, as indicated by the arrow P1.

In one embodiment the shielding element 48 may be a clip which by means of contact regulates the temperature of individual regions of the preform 10 in order to bring about different stretching conditions in the individual regions of the container to be blown. In this way preferential heating would also be conceivable.

Figure 7:
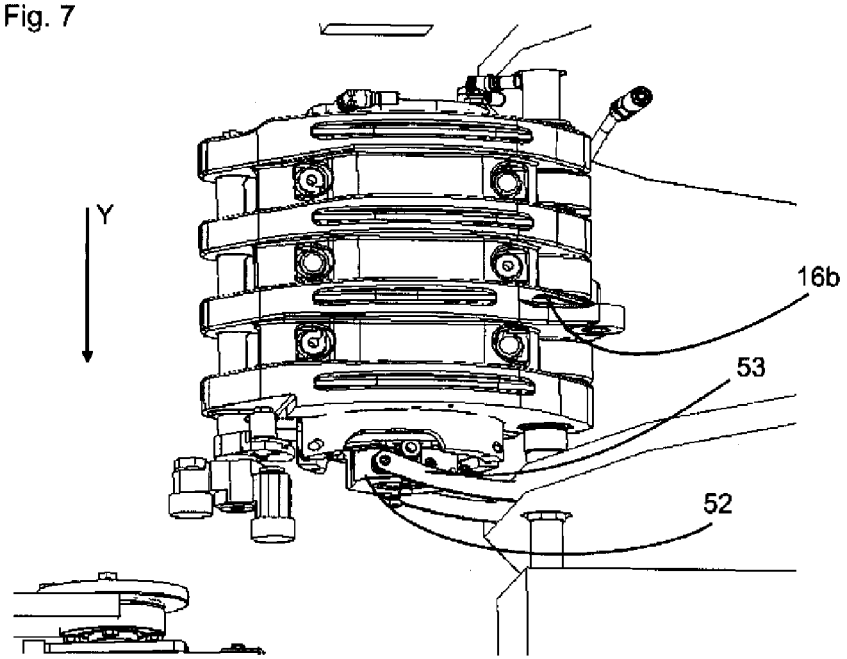
FIG. 7 shows a detail of a blow moulding station.

FIG. 7 shows a further view of the apparatus according to the invention, showing in particular the blow moulding station 16 within which the preforms are expanded to form plastic containers. In this case the preform is introduced again the direction Y into the (now open) blow moulding station and then the blow moulding station is closed. Next, as is known from the prior art, compressed air can be applied to the preform. However, corresponding feed lines for the compressed air are not shown in FIG. 7.

The reference numeral 52 identifies a base part of the blow moulding station which in addition to the parts 16a and 16b closes off a hollow chamber within which the preform is reshaped to the container or the plastic bottle. This base part 52 here is disposed pivotably by means of an arm 53 and can be pivoted away more precisely out of the transport path of the container in the direction Y so that after expansion the container can be pushed through and downwards.

Figure 8:
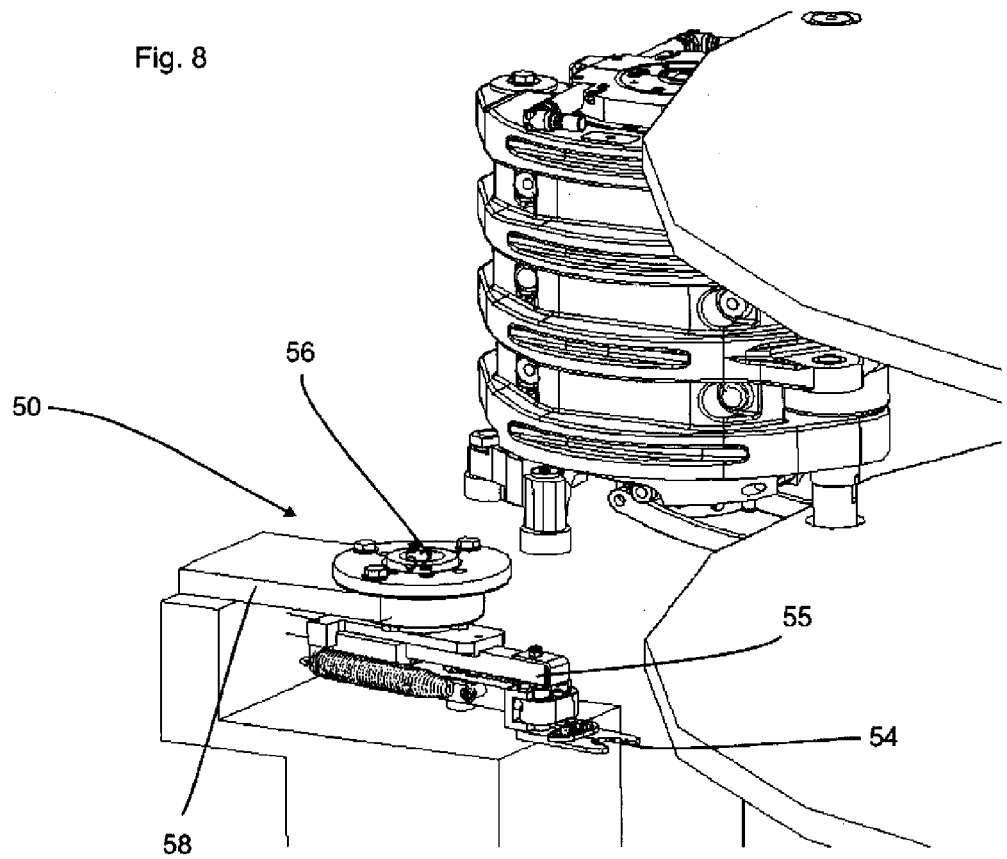
FIG. 8 shows a view of a region of the apparatus according to the invention lying below a blow moulding station.

FIG. 8 shows a further detail of an apparatus according to the invention. The transport unit 50 which serves to take up the finished containers is provided below the blow moulding station. This transport unit 50 also has a gripping device 54 for gripping the containers which are now finished. The gripping device here is disposed on a supporting arm 55 (preferably provided with a linear bearing) and preferably is also pivotable in a plane parallel to the carrier 26. The reference numeral 56 identifies a fastening plate in order to fasten the gripper device 54 to the holding arm 58. In addition the apparatus has cam (not shown) in order to control an opening and closing movement of the gripper device 54. However, it would also be possible for other drives, such as for example servomotors, magnetic or pneumatic drives, to be provided for controlling the gripper device 54. However, it would also be possible for stationary cams for moving the linear bearing out to be disposed on the carriers 24, 26, 28 or stationary in the region of the transport unit. This co-operates with control rollers which are disposed in the linear bearing.

Figure 9:
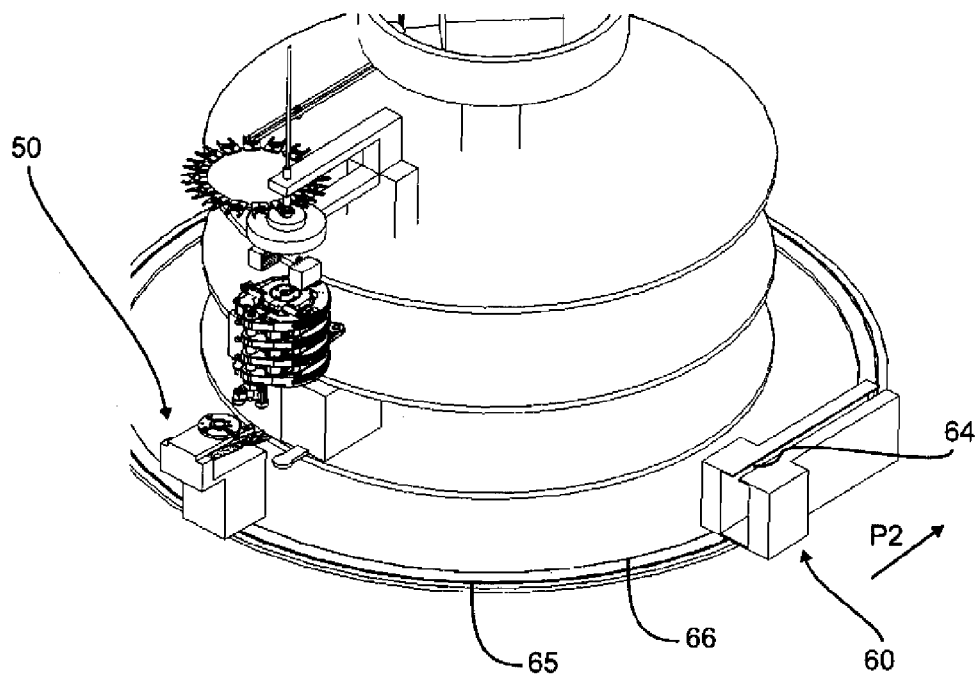
FIG. 9 shows a further overall view of an apparatus according to the invention.

A further overall view of the apparatus according to the invention is shown in FIG. 9. This also shows a base plate on which the apparatus 50 is also disposed as well as a further transport unit 60 which serves for transporting the preforms away. This further transport unit 60 is an air conveyor which has a rail 64 on which the support ring of the preforms or of the containers rests as well as a hollow chamber lying below it which can be supplied for example with compressed air in order in this way to convey the containers in the direction of the arrow P2.

The transport unit 50 is disposed so as to be movable along a circular path in order to transfer the containers to the transport unit 60. For this purpose a circumferential groove 65 for guiding the transport unit is provided in the base plate 66. However, it would also be possible for the entire base plate 65 to be disposed so as to be rotatable and for the transport units 50 in turn to be disposed on the base plate 66. However, movability of the individual transport units 50 in relation to the base plate makes it possible to produce individual gaps between the individual containers.

Sterilising devices (not shown) which sterilise the preforms 10 or containers can also be provided in a part-region of the transport path. The sterilising devices can comprise nozzles or immersion baths which wet the inside or the outside of the preform with hydrogen peroxide or peracetic acid. Sterilisation by means of an e-beam, wherein electrons can be introduced via a nozzle onto the walls of the preform in order to sterilise it are also conceivable. This could take place on an addition carrier (not shown) which is disposed between the heating device 6 and the blow moulding station 4.

Likewise an arrangement of the sterilising devices in the region of the transport devices 30, 46, 34 upstream of the heating device would be conceivable. In order to ensure the sterility of the preform and of the container it is proposed to dispose the regions after the sterilisation by the sterilising devices in a clean chamber (not shown). This clean chamber advantageously extends as far as the closing device.

Figure 10:
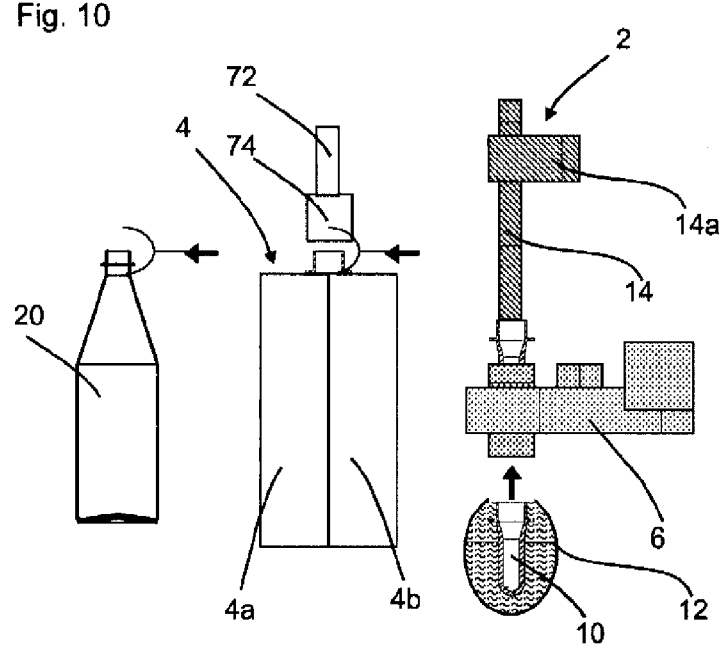
FIG. 10 shows a further embodiment of an apparatus according to the invention.

FIG. 10 shows a schematic view of an apparatus according to the invention in a further embodiment. In this case the preforms are first of all separated and then enter a preheating unit 12 in which they are initially preheated. This preheating unit may for example have an obliquely positioned feed track. Then the preforms are taken up by a transport element 14 which is a component of the transport device 2 and from here is moved upwards into the heating device 6, which here is configured as a microwave oven. In this heating device the preforms are brought to the blowing temperature whilst the next preform 10 is preheated advantageously at the same time.

In this embodiment a cyclical transport of the preforms advantageously takes place.

As soon as the preform has reached the necessary temperature profile, the transport element 14 and the linear drive 14a can move further upwards and can be guided as a unit by means of a transfer unit to the blow moulding station 4. This transfer unit (not shown in detail) transfers the preform into the opened blow moulding station (in FIG. 10 the blow moulding station is shown in a closed state with the two blow mould halves 4a and 4b) and the linear drive 14a takes up the next preform from the preheating unit 12. In the blow moulding station 4 the preform is blow moulded to produce a plastic bottle 20 and this plastic bottle 20 can finally be removed from the blow moulding station by the transfer unit, which in this case has the elements 72 and 74, and can then be transferred to the bottle transport system (not shown). The blow moulding station advantageously has a stretch blow moulding unit and in particular has a stretching rod.

Figure 11:
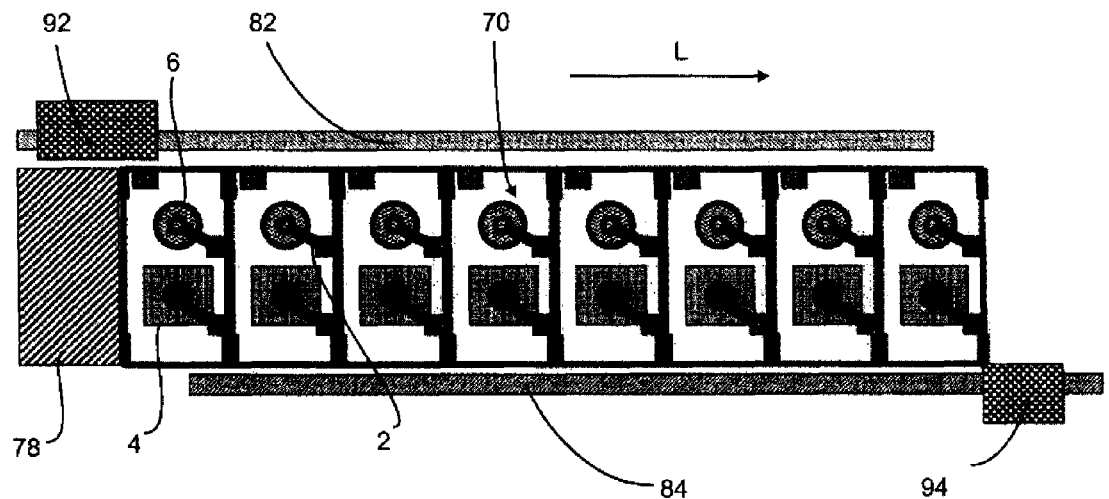
FIG. 11 shows a schematic plan view of an apparatus according to the invention in a further embodiment.

FIG. 11 shows a view of an apparatus according to the invention with a plurality of modular units 70, each of which is composed of a heating device 6 and a blow moulding station 4. The reference numeral 2 identifies the transport device as a whole which conveys the preforms from the heating device 6 to the blow moulding station 4. The reference numeral 92 relates to a central treatment in which all preforms are treated for example continuously, such as for example an inspection, preheating, base cooling or sterilisation. Starting from this central treatment the preforms can be moved in a longitudinal direction L for example relative to a track 82. Also the reference numeral 94 relates to such a central treatment unit such as an inspection, sterilisation or the like.

The preforms could also be moved in the direction L along a guide or by a transport system. Also these central treatment units 92, 94 can be moved along the tracks 82, 84 in the direction L.

The reference numeral 78 identifies a central control means which controls both the individual modular units 70 and the respective treatment stations 92 and 94.

Figure 12:
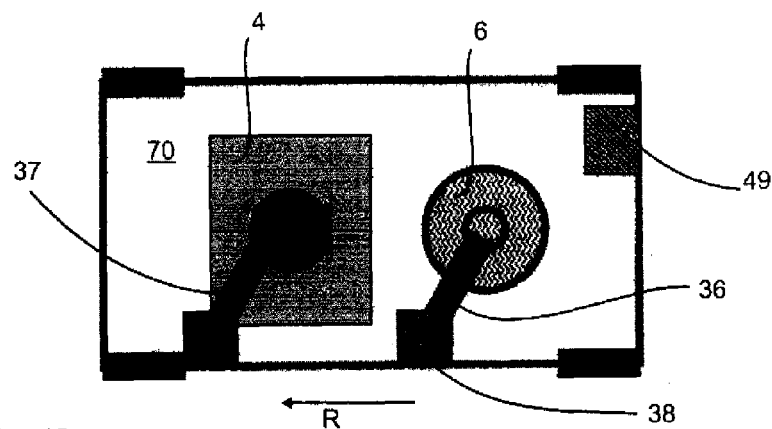
FIG. 12 shows a representation of an individual modular unit.

FIG. 12 shows a more detailed view of a modular unit 70. Here the transport device 2 has a transport arm 36 which can be disposed for example so as to be pivotable at a docking point 38 or can also be movable in the direction R. The linear guide 14 shown in FIG. 10 can be disposed on this transport arm 36. The reference numeral 37 identifies a further transport arm which in this case guides the plastic preform to a blow moulding station 4. In operation it is possible that for example while a finished container is removed from the blow moulding station by the transport arm 37 at the same time a heated preform is transferred to the blow moulding station 4 by the transport arm 36.

Figure 13:
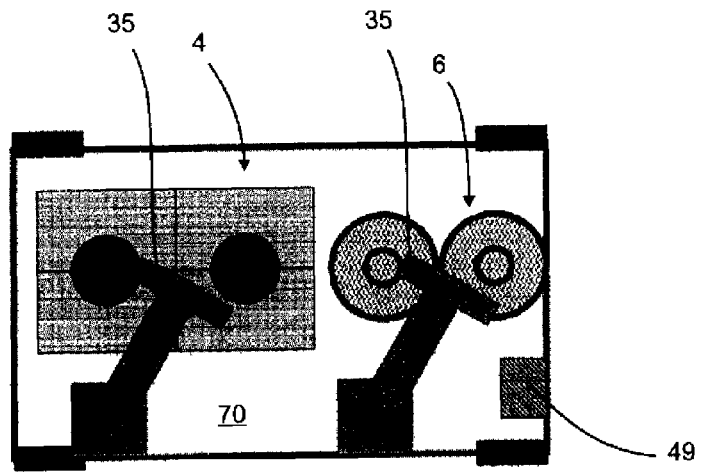
FIG. 13 shows a representation of a further embodiment of a modular unit consisting of a heating unit and a blow moulding station.

FIG. 13 shows a further embodiment of an apparatus according to the invention. The transport arms 36, 37 are provided here too, but in this case the apparatus is configured in such a way that two preforms can be disposed on each transport arm by way of a corresponding cantilever 35. Thus in this case the modular unit 70 has a twin blowing unit 4 and also a twin heating unit 6. Correspondingly it would also be possible to combine several heating devices, for example triple or quadruple devices. The reference numeral 49 relates to a control device for controlling the modular unit 70. In this case, as can also be seen from FIG. 11, each modular unit 70 can have its own control means, although the entire machine is controlled by the central control means 78 mentioned above.

It would also be possible to combine elements of the apparatus illustrated in FIGS. 10 to 13 with elements of the apparatus illustrated in FIGS. 1 to 9, for example also to use the control devices 49 in the embodiments shown in FIGS. 1 to 9.

The applicant reserves the right to claim all the features disclosed in the application documents as essential to the invention so long as they are novel individually or in combination relative to the prior art.

LIST OF REFERENCES 1 apparatus
2 transport device
4 blow moulding station
4a, 4b blow mould halves
6 heating device
7 resonator
10 container
12 preheating unit
14 transport element
14a linear drive
16a, 16b blow mould halves
17 hollow waveguide
18,24,26,28 carrier
20 container, plastic bottle
22 labelling device
30 transport unit
32 rotatable gripping elements
34 housing
35 cantilever
36 transport arm
37 further transport arm
38 docking point
40 transport unit
41 mandrel, blowing nozzle
42 heating device
43 collecting container
44 outlet opening
45 valve block
46 transport track
48 shielding element
49 control device
50 transport unit
52 base part
53 arm
54 gripping device
55 supporting arm
56 fastening plate
58 holding arm
60 further transport unit
64 track
65 groove
66 base plate
70 modular unit
72, 74 elements
78 central control means
82, 84 guiding device
92, 94 central handling unit
P1, P2 arrow
L longitudinal direction
R direction
Y direction

What is claimed is:

1. Apparatus for reshaping plastic preforms into plastic containers, comprising:
    a plurality of shaping stations each having at least one receiving chamber within which the plastic preforms can be expanded to produce the plastic containers;
    a transport device which transports the plastic preforms along at least one predetermined transport path; and
    a plurality of heating devices which are disposed along the at least one predetermined transport path upstream of the shaping stations;
    at least one heating path for transporting the plastic preforms through the heating device, wherein the at least one heating path is distinct from the transport device,
    wherein a first heating device in the plurality of heating devices is associated with a first shaping station in the shaping stations, the first heating device operating at a first temperature,
    wherein a second heating device in the plurality of heating devices is associated with a second shaping station in the shaping stations, the second heating device operating at a second temperature which can be distinct from the first temperature,
    wherein a coordination between the plurality of heating devices and the shaping stations is established,
    wherein the coordination between the plurality of heating devices and the shaping stations enables individual treatment of different plastic preforms at different temperatures.

2. Apparatus according to claim 1, wherein at least one of the shaping stations and the heating devices are disposed so as to be stationary.

3. Apparatus according to claim 1, wherein the shaping stations are disposed along a circular path.

4. Apparatus according to claim 1, wherein at least one heating device is a microwave heating device.

5. Apparatus according to claim 1, wherein at least one heating device is disposed radially within at least one shaping station.

6. Apparatus according to claim 1, wherein a distributor is provided radially within the shaping stations to distribute the preforms to the heating devices.

7. Apparatus according to claim 1, wherein a respective heating device with a respective shaping station is constructed as a modular unit.

8. Apparatus according to claim 7, wherein the modular unit has a transport device to convey the preforms from the heating device to the shaping station.

9. Apparatus according to claim 1, wherein the apparatus has a preheating unit for heating the preforms.

10. Apparatus according to claim 9, wherein the preheating unit is disposed upstream relative to the heating device in the transport direction of the preforms.

11. Apparatus according to claim 1, wherein the apparatus has an additional transport device which removes the blow moulded containers from the shaping stations.

12. Apparatus according to claim 1, wherein at least one transport device transports the containers cyclically.

13. Apparatus according to claim 1, wherein the heating devices are disposed in a peripheral direction in each case between a first downstream shaping station and a second downstream shaping station.

14. Apparatus according to claim 1, wherein an additional heating device is associated with each shaping station.

15. Apparatus according to claim 1, wherein precisely one shaping station is associated with precisely one heating device.

16. Apparatus according to claim 1, wherein multiple shaping stations are associated with one heating device.

17. Apparatus according to claim 1, wherein shaping stations and heating devices are constructed together as modular units.

18. Apparatus for reshaping plastic preforms into plastic containers, comprising:
- a plurality of shaping stations each having at least one receiving chamber within which the plastic preforms can be expanded to produce the plastic containers;
- a transport device which transports the containers along at least one predetermined transport path;
- a plurality of heating devices which are disposed along the at least one predetermined transport path of each container upstream of the shaping stations, the plurality of heating devices having a first heating device assigned to a specific shaping station in the shaping stations and a second heating device also assigned to the specific shaping station, wherein the first heating device and the second heating device operate at different temperatures, and wherein a coordination between the plurality of heating devices and the shaping stations is established; and
- at least one heating path for transporting the plastic preforms through the plurality of heating devices, wherein the at least one heating path is distinct from the transport device.

19. Apparatus for reshaping plastic preforms into plastic containers, comprising:
- a plurality of shaping stations each having at least one receiving chamber within which the plastic preforms can be expanded to produce the plastic containers;
- a transport device which transports the containers along at least one predetermined transport path; and
- a plurality of heating devices which are disposed along the transport path of each container upstream of the shaping stations, wherein each heating device in the plurality of heating devices can operate at a distinct temperature from other heating devices in the plurality of heating devices;
- a heating path, distinct from the at least one predetermined transport path, for transporting the plastic preforms through the plurality of heating devices;
- wherein each heating device in the plurality of heating devices is assigned to at least one shaping station in the plurality of shaping stations,
- wherein a coordination between the plurality of heating devices and the shaping stations is established,
- wherein at least one of the shaping stations and the heating devices are stationary, and
- wherein each of the plurality of shaping stations is constructed together with one of the plurality of heating devices as a modular unit.

20. The apparatus of claim 19, wherein at least one heating device is a microwave heating device.

21. Method of reshaping plastic preforms into plastic containers, comprising:
- transporting the plastic preforms by a transport device along at least one transport path;
- heating the plastic preforms by means of a heating device; and
- after the heating operation, reshaping the heated plastic preforms into plastic containers by means of shaping stations,
- wherein the plastic preforms which are heated by a specific heating device are expanded to plastic containers by a predetermined shaping station,
- wherein a coordination is established between the specific heating device and the predetermined shaping station,
- wherein paths on which the plastic preforms are transported through the heating device on a different path than the at least one transport path, and
- wherein the coordination between the specific heating device and the predetermined shaping station enables individual treatment of different plastic preforms at different temperatures.

22. Method according to claim 21, wherein at least two containers are transported on different paths.

* * * * *